United States Patent
Zhou

(10) Patent No.: US 11,556,614 B2
(45) Date of Patent: Jan. 17, 2023

(54) APPARATUS AND METHOD FOR CONVOLUTION OPERATION

(71) Applicant: APOLLO INTELLIGENT DRIVING TECHNOLOGY (BEIJING) CO., LTD., Beijing (CN)

(72) Inventor: Zhongliang Zhou, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/697,917

(22) Filed: Mar. 17, 2022

(65) Prior Publication Data
US 2022/0207106 A1    Jun. 30, 2022

Related U.S. Application Data

(63) Continuation of application No. PCT/CN2020/083574, filed on Apr. 7, 2020.

(51) Int. Cl.
*G06F 17/15* (2006.01)
*G06F 17/16* (2006.01)

(52) U.S. Cl.
CPC ............ *G06F 17/153* (2013.01); *G06F 17/16* (2013.01)

(58) Field of Classification Search
CPC ............................... G06F 17/153; G06F 17/16
(Continued)

(56) References Cited

U.S. PATENT DOCUMENTS 8,117,247 B1    2/2012  Taylor
2008/0313439 A1  12/2008  Suzuki
(Continued)

FOREIGN PATENT DOCUMENTS

CN    104915322 A    9/2015
CN    106127302 A    11/2016
(Continued)

OTHER PUBLICATIONS

Oweiss et al., "A Scalable Wavelet Transform VLSI Architecture for Real-Time Signal Processing in High-Density Intra-Cortical Implants," IEEE Transactions on Circuits and Systems I: Regular Papers, 2007, vol. 54, No. 6, pp. 1266-1278.
(Continued)

*Primary Examiner* — Tan V Mai
(74) *Attorney, Agent, or Firm* — Mauriel Kapouytian Woods LLP; Wensheng Ma; Liang Huang

(57) ABSTRACT

An apparatus for convolution operation is provided. The apparatus includes: a plurality of multipliers configured to receive matrix elements of two matrices, and multiply respective matrix elements to generate a plurality of product elements; a plurality of distributed caches each including a plurality of cache units and configured to respectively store the plurality of product elements in respective cache units; a register delay chain including a plurality of registers coupled in series and configured to receive a read control signal, delay the read control signal per stage to output a plurality of per-stage delayed read control signals, and respectively provide, to the plurality of distributed caches, the read control signal and the plurality of per-stage delayed read control signals; and an accumulator circuit configured to receive product elements in cache units corresponding to the read control signal and the plurality of per-stage delayed read control signals, and to generate an accumulation data based on the received product elements.

20 Claims, 5 Drawing Sheets

(58) Field of Classification Search
USPC .......................................................... 708/420
See application file for complete search history.

(56) References Cited

U.S. PATENT DOCUMENTS

| | | | |
|---|---|---|---|
| 2017/0116495 A1 | 4/2017 | Nomura et al. | |
| 2018/0150721 A1 | 5/2018 | Mostafa et al. | |
| 2018/0341495 A1 | 11/2018 | Culurciello et al. | |
| 2019/0026078 A1 | 1/2019 | Bannon et al. | |
| 2019/0228051 A1 | 7/2019 | Langhammer et al. | |

FOREIGN PATENT DOCUMENTS

| | | | | |
|---|---|---|---|---|
| CN | 106447037 A | | 2/2017 | |
| CN | 106485319 A | | 3/2017 | |
| CN | 106503797 A | | 3/2017 | |
| CN | 106844294 A | | 6/2017 | |
| CN | 106940815 A | | 7/2017 | |
| CN | 107301455 A | | 10/2017 | |
| CN | 108804139 A | | 11/2018 | |
| CN | 108805276 A | * | 11/2018 | ........... G06F 12/082 |
| CN | 109784489 A | | 5/2019 | |
| CN | 109993272 A | | 7/2019 | |
| CN | 110070178 A | | 7/2019 | |
| CN | 110135554 A | | 8/2019 | |
| CN | 110175670 A | | 8/2019 | |
| CN | 110210610 A | | 9/2019 | |
| CN | 110717588 A | | 1/2020 | |
| JP | H3-201817 A | | 9/1991 | |
| JP | H5-158966 A | | 6/1993 | |

OTHER PUBLICATIONS

Omondi et al., "FPGA Implementations of Neural Networks," Springer, 2006, 363 pages.

* cited by examiner

APPARATUS AND METHOD FOR CONVOLUTION OPERATION

CROSS-REFERENCE TO RELATED APPLICATIONS

The present application is a continuation of International Application No. PCT/CN2020/083574, filed on Apr. 7, 2020, which claims priority to Chinese Patent Application No. 201910977395.3 filed on Oct. 15, 2019. The entire contents of the aforementioned applications are hereby incorporated by reference in their entireties for all purposes.

TECHNICAL FIELD

Embodiments of the present disclosure mainly relate to the field of data processing, and more specifically to an apparatus and a method for convolution operation.

BACKGROUND ART

With the proposal and development of deep learning, convolutional neural networks have received increasing attention and have been developed. Convolution algorithm is the core algorithm of the convolutional neural network, and accounts for 90% of operation time of a convolutional neural network. Therefore, convolution operations are the primary optimization objects for designing a neural network hardware accelerator based on a field programmable gate array (FPGA). Hardware circuit design for convolution algorithm directly affects resource usage of the hardware accelerator and computing power that can be achieved.

An adder tree structure, which is defined based on a convolution algorithm, is employed in one of conventional solutions. In the implementation of adder tree for convolution, six dimensions of convolution calculation are fully expanded based on a 6-layer loop characteristics of the convolution algorithm. To be specific, multiplication is first performed between corresponding points in a filter matrix and in an input data matrix, and then accumulation is performed per point within a window of the filter matrix and in the direction of a channel. This implementation is simple and straightforward. However, this implementation also has obvious shortcomings. If the dimension of computing is increased, the depth of an adder needs to be increased, and the amount of consumed resource increases exponentially, which is unacceptable for a resource-sensitive FPGA.

SUMMARY OF THE INVENTION

According to embodiments of the present disclosure, an apparatus and a method for convolution operation with improved performance are provided.

In a first aspect of the present disclosure, an apparatus for convolution operation is provided. The apparatus comprises: a plurality of multipliers configured to receive matrix elements from a first matrix and from a second matrix, respectively, and to generate a plurality of product elements, wherein each product element of the plurality of product elements is obtained by multiplying, by a respective multiplier, matrix elements of the first matrix and corresponding matrix elements of the second matrix; a plurality of distributed caches respectively coupled to the plurality of multipliers and each distributed cache of the plurality of distributed caches comprising a plurality of cache units, wherein the plurality of distributed caches is each configured to store a respective one of the plurality of product elements in a respective cache unit thereof; a register delay chain coupled to the plurality of distributed caches and comprising a plurality of registers coupled in series, wherein the register delay chain is configured to receive a read control signal, to delay the read control signal per stage to output a plurality of per-stage delayed read control signals, and to respectively provide, to the plurality of distributed caches, the read control signal and the plurality of per-stage delayed read control signals; and an accumulator circuit coupled to the plurality of distributed caches and configured to receive, from the plurality of distributed caches, product elements in cache units corresponding to the read control signal and the plurality of per-stage delayed read control signals, and to generate an accumulation data based on the received product elements in the respective cache units of the plurality of distributed caches.

In a second aspect of the present disclosure, a method for convolution operation is provided. The method comprises: receiving matrix elements from a first matrix and from a second matrix, and multiplying matrix elements of the first matrix with corresponding matrix elements of the second matrix to generate a plurality of product elements; respectively storing the plurality of product elements in respective cache units of a plurality of distributed caches; receiving a read control signal, delaying the read control signal per stage to output a plurality of per-stage delayed read control signals, and respectively providing, to the plurality of distributed caches, the read control signal and the plurality of per-stage delayed read control signals; receiving, from the plurality of distributed caches, product elements in cache units corresponding to the read control signal and the plurality of per-stage delayed read control signals; and generating accumulation data based on the received product elements in the respective cache units of the plurality of distributed caches.

It should be understood that the content described in the summary is not intended to limit critical or significant features of the embodiments of the present disclosure, nor is it intended to limit the scope of the present disclosure. Other features of the present disclosure will be easily comprehensible from the following description.

BRIEF DESCRIPTION OF THE DRAWINGS

The above and other features, advantages, and aspects of various embodiments of the present disclosure will become more apparent in conjunction with the drawings and with reference to the following detailed description. In the drawings, the same or similar reference numerals denote the same or similar elements. In the figures.

DETAILED DESCRIPTION OF EMBODIMENTS

Figure 1:
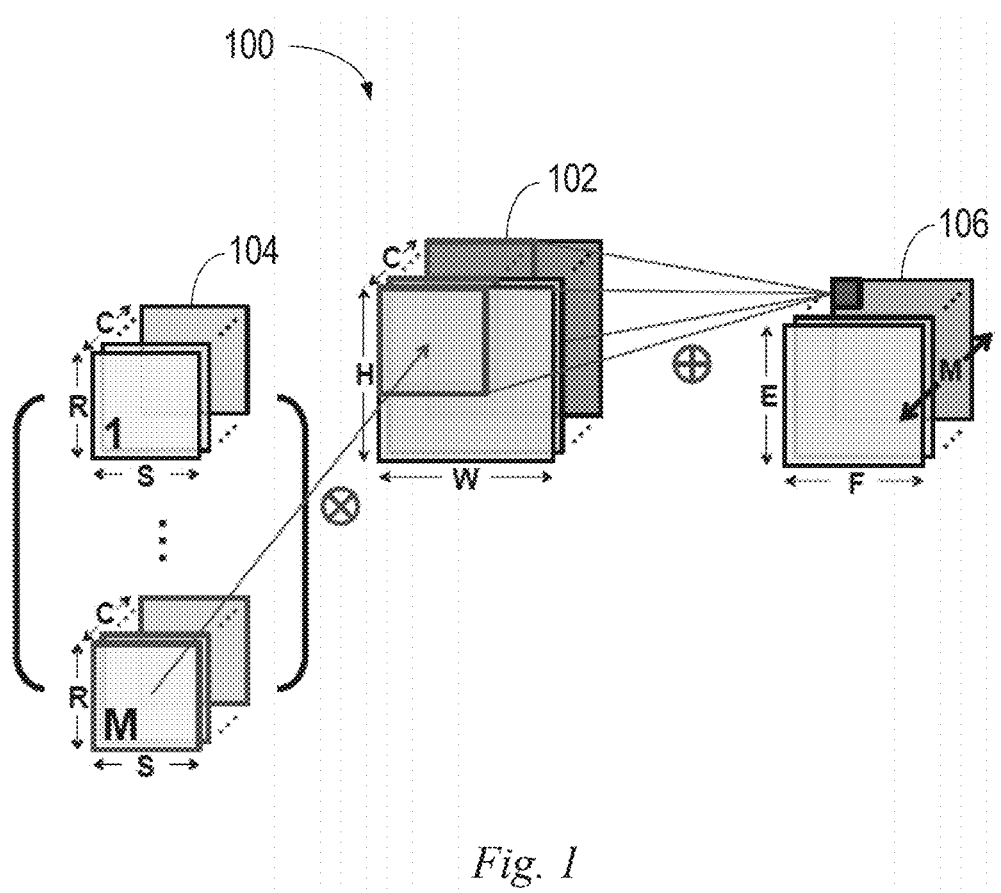
FIG. 1 is a schematic diagram showing a model for convolution operation.

Embodiments of the present disclosure will be described in more detail below with reference to the accompanying drawings. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the accompanying drawings and the embodiments of the present disclosure are merely for illustrative purposes, and are not intended to limit the scope of protection of the present disclosure.

In the description of the embodiments of the present disclosure, the term "comprise" and similar terms should be understood as non-exclusive inclusion, that is, "including but not limited to". The term "based on" should be understood as "at least partially based on". The terms "an embodiment" or "the embodiment" should be understood as "at least one embodiment". The terms "first", "second", and the like may refer to different or the same objects. Other explicit and implicit definitions may also be included below.

Compared with the above-mentioned implementation of adder tree for convolution, in order to reduce the amount of resource to be used, a systolic array structure is used in another conventional solution. A systolic array implementation involves a spatially expansion of the five dimensions of a convolution calculation and a temporally expansion of the dimension of a channel. This solution can effectively utilize resources because when the dimensions of convolution calculation increases, resources required for the systolic array implementation do not need to be increased, but only the accumulation in the direction of the channel is extended in the time dimension. This conventional solution implements a delay chain in the dimension of the channel by using register resources in an FPGA. For example, in this conventional solution, registers are used to delay intermediate calculation data by six clock cycles before accumulation. However, such a solution also has a shortcoming that register resources are consumed excessively. FPGA overall resources usually comprise a lookup table (LUT), an LUT memory (LUTM), a register, and a digital signal processor (DSP). Excessive consumption of register resources will cause the unbalanced use of the FPGA overall resources, which leads to the "bucket effect".

In order to solve at least the above-mentioned problems, the embodiments of the present disclosure provide a convolution operation solution that can save hardware resources and balance the required hardware resources. According to an embodiment of the present disclosure, a product of two corresponding matrix elements, each in one matrix, is stored in a respective cache unit of a plurality of distributed caches. A read control signal for the respective cache unit of the plurality of distributed caches is delayed per stage by a register delay chain. An accumulation result is generated based on products which are received from the plurality of distributed caches and which were stored in respective cache units corresponding to read control signals.

In embodiments according to the present disclosure, by configuring a plurality of distributed caches and a register delay chain for read control signal for the plurality of distributed caches, a functionality similar to that of a register delay chain for intermediate calculation data in the systolic array structure is achieved, which facilitates the implementation of convolution operation. Therefore, the read control signal is delayed per stage while the products are maintained in the distributed caches, so as to prevent the transfer of intermediate calculation data by the register delay chain as in the systolic array structure. In this way, the convolution operation solution according to the embodiments of the present disclosure reduces overall power consumption while saving register resources. In some embodiments, utilizing distributed caches that are usually idle, such as LUTMs in an FPGA, can save overall design resources and achieve resource balancing.

The present disclosure will be described in detail below in conjunction with the accompanying drawings and with reference to various embodiments.

FIG. 1 is a schematic diagram showing a model 100 for convolution operation. As shown in FIG. 1, an input data set matrix comprises a plurality of input data matrices 102, and a filter set matrix comprises a plurality of filter matrices 104. The input data matrix 102 is a matrix of various data output by a sensor, and the filter matrix 104 is a window matrix for performing a convolution operation. For example, annotation C shown in FIG. 1 represents the number of channels of input data matrices 102 in the input data set matrix or the number of channels of filter matrices 104 in the filter set matrix. In addition, the dimensions of each input data matrix 102 are H×W, and the dimensions of each filter matrix 104 are R×S.

Referring to FIG. 1, convolution operations are performed on a plurality of filter matrices 104 in each filter set matrix and the plurality of input data matrices 102 in the input data set matrix, to generate one output matrix 106. Therefore, when a plurality of filter set matrices are used for convolution operation, a plurality of output channels of output matrices 106 are generated. For example, when M filter set matrices are used, M channels of output matrices 106 are generated, and the dimensions of each output matrix 106 are E×F.

In the convolution operation, performing a convolution operation on a filter matrix 104 and a corresponding input data matrix 102 at one window means multiplying matrix elements in a submatrix of the input data matrix 102 that corresponds to the window by corresponding matrix elements of the filter matrix 104 to generate product elements, and these product elements are summed up to generate an accumulation data. For example, as shown in FIG. 1, convolution operations are performed on C filter matrices 104 and C input data matrices 102 at the window shown to generate C pieces of accumulation data, and these C pieces of accumulation data are summed up to generate one matrix element in the output matrix 106. Matrix elements in the output matrix 106 are generated by shifting the window within the input data matrix 102. Further, when M filter set matrices instead of one matrix are used, M output matrices 106 are generated as described above for use in calculation in following stages.

Hereinafter, a convolution operation on a plurality of filter matrices 104 and the corresponding submatrices of a plurality of input data matrices 102 at one window will be taken as an example for description.

Figure 2:
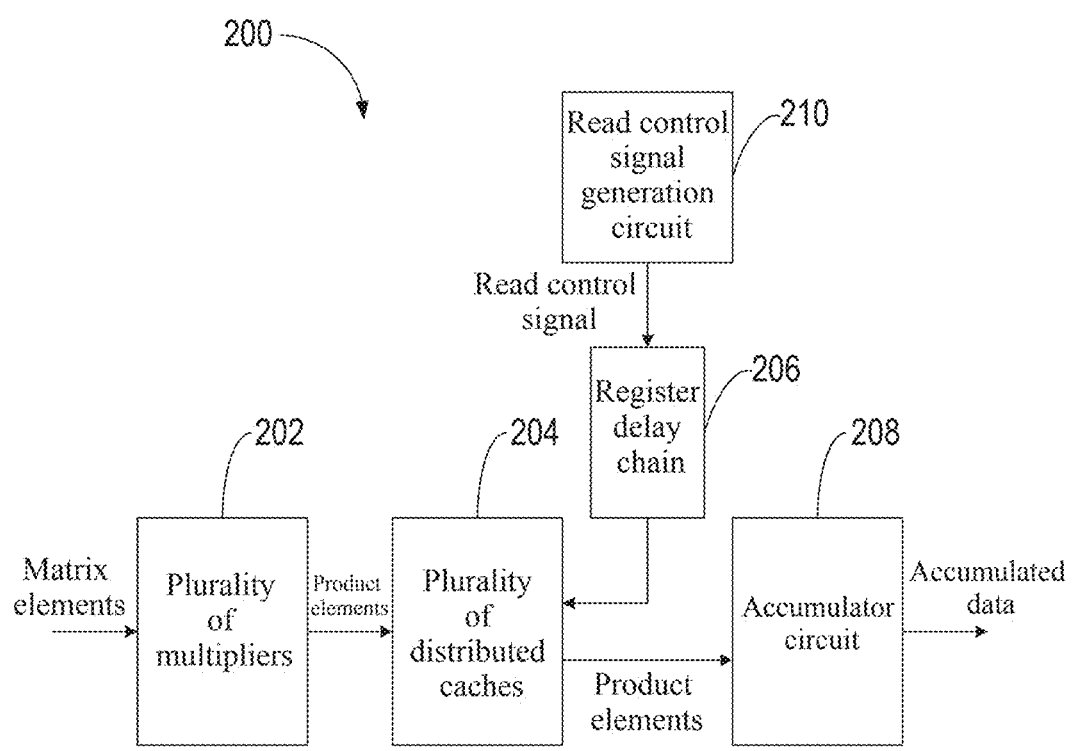
FIG. 2 is a block diagram showing an apparatus for convolution operation according to an embodiment of the present disclosure.

FIG. 2 is a block diagram showing an apparatus 200 for convolution operation according to an embodiment of the present disclosure. As shown in FIG. 2, the apparatus 200 comprises a plurality of multipliers 202, a plurality of distributed caches 204, a register delay chain 206, and an accumulator circuit 208.

The plurality of multipliers 202 are configured to receive matrix elements from a first matrix and from a second matrix, respectively, and to generate a plurality of product elements, wherein each product element of the plurality of product elements is obtained by multiplying, by a respective multiplier, matrix elements of the first matrix and corresponding matrix elements of the second matrix. In some embodiments, the first matrix is an input data set matrix of input data matrices including a plurality of channels, and the second matrix is a filter set matrix of filter matrices including a plurality of channels. In some embodiments, in each clock cycle of a plurality of clock cycles, the plurality of multipliers 202 receive matrix elements and generate a plurality of product elements. In some embodiments, the input data set matrix includes input data matrices with C channels, the filter set matrix includes filter matrices with C channels. In each of the C clock cycles the plurality of multipliers 202 receive matrix elements of input data matrix from one channel and of filter matrix from one corresponding channel, and generate a plurality of product elements.

The plurality of distributed caches 204 are respectively coupled to the plurality of multipliers 202 and each comprise a plurality of cache units. The plurality of distributed caches 204 are each configured to store a respective one of the plurality of product elements in a respective cache unit thereof. In some embodiments, in each clock cycle of a plurality of clock cycles, the plurality of distributed caches 204 receive a plurality of product elements from a plurality of multipliers 202, and store each of the plurality of product elements in a respective cache unit that correspond to the clock cycle in a respective one of the plurality of distributed caches, respectively. In some embodiments, in a plurality of clock cycles, each of the plurality of distributed caches 204 sequentially stores a plurality of product elements in respective cache units thereof.

The register delay chain 206 is coupled to the plurality of distributed caches 204 and includes a plurality of registers coupled in series. The register delay chain 206 is configured to receive a read control signal, delay the read control signal per stage to output a plurality of per-stage delayed read control signals, and respectively provide, to the plurality of distributed caches 204, the read control signal and the plurality of per-stage delayed read control signals. In some embodiments, in each clock cycle of a plurality of clock cycles, the register delay chain 206 receives a read control signal which corresponds to a respective cache unit of each distributed cache. In some embodiments, in each of the plurality of clock cycles, a first distributed cache in the plurality of distributed caches 204 receives an undelayed read control signal. In some embodiments, in each clock cycle of a plurality of clock cycles, each register in the register delay chain 206 delays a read control signal received by the register, and provides, in a next clock cycle, the delayed read control signal to the corresponding cache unit and a register of the next stage.

The accumulator circuit 208 is coupled to the plurality of distributed caches 204. The accumulator circuit 208 is configured to receive, from the plurality of distributed caches 204, product elements in cache units corresponding to the read control signal and the plurality of per-stage delayed read control signals, and to generate an accumulation data based on the received product elements in the respective cache units of the plurality of distributed caches. In some embodiments, in each clock cycle of a plurality of clock cycles, the accumulator circuit 208 receives, from the plurality of distributed caches 204, product elements in cache units corresponding to the read control signals received by the distributed caches. In some embodiments, the accumulator circuit 208 accumulates product elements received from cache units of the plurality of distributed caches 204 that correspond to the same clock cycle. In some embodiments, the accumulator circuit 208 accumulates product elements generated in the same clock cycle. In some embodiments, when the input data set matrix includes input data matrices with C channels and the filter set matrix includes filter matrices with C channels, after C clock cycles, the accumulator circuit 208 outputs a result of a convolution operation on one channel of input data matrix and one corresponding channel of filter matrix within a certain window, and after another clock cycle, the accumulator circuit 208 outputs a result of a convolution operation on another channel of input data matrix and one corresponding channel of filter matrix within a certain window, and so on.

Referring to FIG. 2, in some embodiments, the apparatus 200 may further include a read control signal generation circuit 210. The read control signal generation circuit 210 is configured to sequentially generate read control signals that correspond to the plurality of cache units of the plurality of distributed caches, respectively 204. In some embodiments, in each clock cycle of a plurality of clock cycles, the read control signal generation circuit 210 generates read control signals corresponding to the respective cache units of the plurality of distributed caches 204. In some embodiments, in each clock cycle of a plurality of clock cycles, the read control signal generation circuit 210 generates a read control signal that includes a read address for one of the plurality of cache units, and increase the read address by one address unit in a next clock cycle. In some embodiments, the read address corresponds to a cache unit, a clock cycle phase, and a product element generated in the clock cycle.

In some embodiments, in response to receiving, by each of the plurality of distributed caches 204, the read control signal and the plurality of per-stage delayed read control signals, the plurality of distributed caches 204 output, to the accumulator circuit 208, product elements in cache units corresponding to the read address in the read control signal.

According to embodiments of the present disclosure, by configuring a plurality of distributed caches and a register delay chain for read control signals for the plurality of distributed caches, the read control signal are delayed per stage while the products are maintained in the distributed caches, so as to prevent the transfer of intermediate calculation data by the register delay chain as in the systolic array structure. In this way, an apparatus 200 according to embodiments of the present disclosure reduces overall power consumption while saving register resources.

In some embodiments, the apparatus 200 is included in an FPGA. In an alternative embodiment, the apparatus 200 is included in an application-specific integrated circuit.

In some embodiments, each distributed cache is an LUTM resource in the FPGA. For example, the FGPA is a Xilinx FPGA. In this way, a usually idle LUTM in the FPGA is used as the distributed cache, such that overall design resources are saved and resource balancing is achieved. In addition, because the LUTM is easily operated and does not involve complex control logic, a higher design dominant frequency can be supported, and the overall computing power of a neural network accelerator can be improved.

Figure 3:
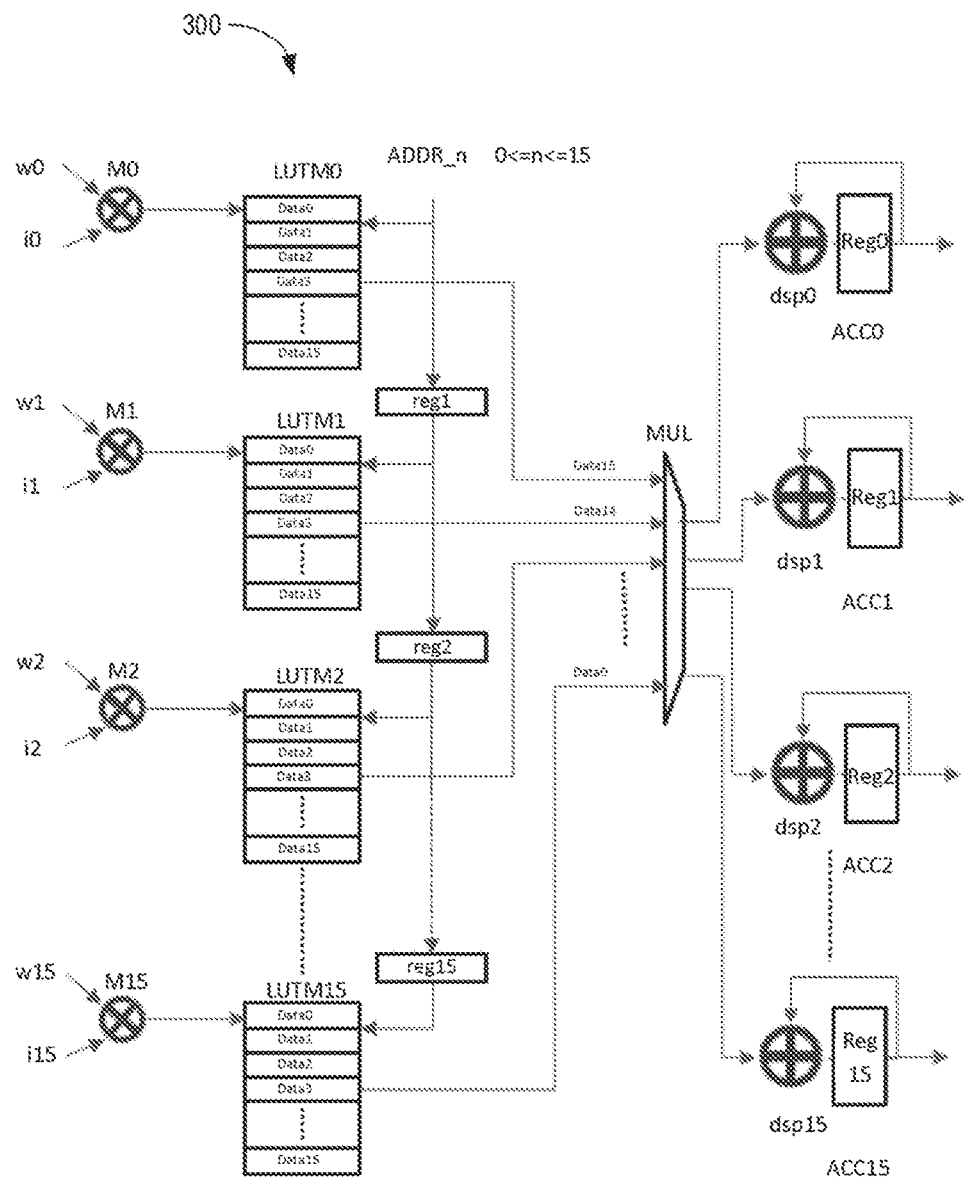
FIG. 3 is a schematic diagram showing an apparatus for convolution operation according to an embodiment of the present disclosure.

FIG. 3 is a schematic diagram showing an apparatus 300 for convolution operation according to an embodiment of the present disclosure. The apparatus 300 of FIG. 3 includes a plurality of multipliers 202, a plurality of distributed caches 204, a register delay chain 206, and an accumulator circuit 208. The apparatus 300 may be considered as an implementation of the apparatus 200. It should be understood that for simplicity of illustration, FIG. 3 shows a read control signal ADDR_n without illustrating the configuration of any read control signal generation circuit 210. The read control signal generation circuit 210 can be implemented by any circuit known to the art.

Referring to FIG. 3, the plurality of multipliers 202 includes multipliers M0 to M15, the plurality of distributed caches 204 includes distributed caches LUTM0 to LUTM15, the register delay chain 206 includes a plurality of registers reg1 to reg15, and the accumulator circuit 208 includes a multiplexer MUL module and accumulators ACC0 to ACC15. In addition, matrix elements w0 to w15 of a filter matrix are input to the multipliers M0 to M15, respectively, and the corresponding matrix elements i0 to i15 of an input data matrix are input to the multipliers M0 to M15, respectively. In addition, the distributed caches LUTM0 to LUTM15 each include a plurality of cache units Data0 to Data15. It should be understood that although FIG. 3 shows the number of various components, the apparatus 300 according to this embodiment of the present disclosure may include any other number of various components.

In some embodiments, the number of multipliers M0 to M15 is equal to the number of matrix elements in the filter matrix. In some embodiments, the number of distributed caches LUTM0 to LUTM15 is equal to the number of matrix elements in the filter matrix. In some embodiments, the number of cache units Data0 to Data15 of each of the distributed caches LUTM0 to LUTM15 is equal to the number of channels of filter matrices. In some embodiments, the number of accumulators ACC0 to ACC15 is equal to the number of cache units Data0 to Data15. In some embodiments, the number of registers reg1 to reg15 is less than the number of distributed caches LUTM0 to LUTM15 by a predetermined value. For example, the determined value is 1. As an example, in FIG. 3, the number R×S of matrix elements of the filter matrix is equal to 16, and the number C of channels of filter matrices is equal to 16.

Referring to FIG. 3, the multipliers M0 to M15 are coupled to the distributed caches LUTM0 to LUTM15, respectively. The registers reg1 to reg15 are coupled in series with each other to form a delay chain, the register reg1 receives the read control signal ADDR_n as an input to the delay chain, and outputs of the registers reg1 to reg15 are coupled to the distributed caches LUTM1 to LUTM15, respectively. The distributed caches LUTM0 to LUTM15 are coupled to the multiplexer MUL module. In some embodiments, each of the distributed caches LUTM0 to LUTM15 is a ring cache. The multiplexer MUL module is coupled to the accumulators ACC0 to ACC15. Each accumulator includes an adder and a register, the output of the adder being coupled to the register while the output of the register being coupled to the adder as one input of the adder to achieve accumulation. Each of the outputs of the multiplexer MUL module is coupled to the other input of a corresponding adder. The accumulator ACC0 includes an adder dsp0 and a register Reg0. The accumulator ACC1 includes an adder dsp1 and a register Reg1. Analogously, the accumulator ACC15 includes an adder dsp15 and a register Reg15.

Figure 4:
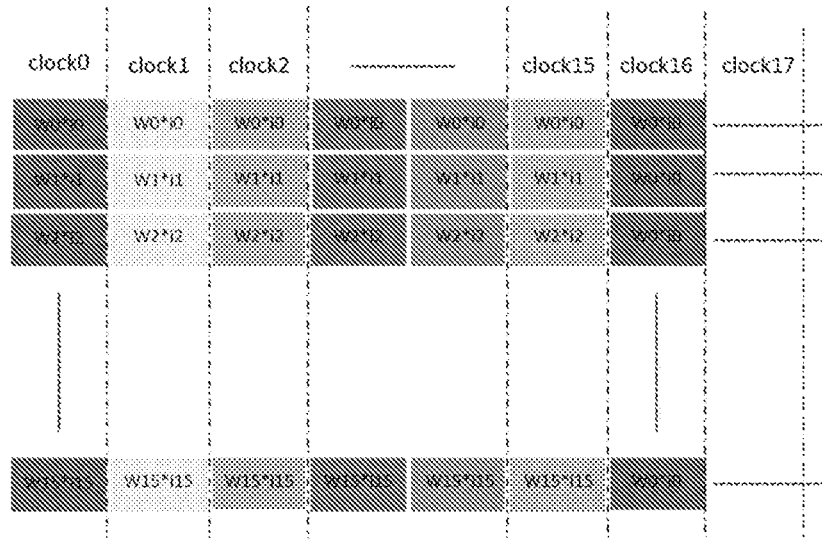
FIG. 4 is a schematic diagram showing matrix elements that are input in various clock cycles and product elements that are generated in the clock cycles according to an embodiment of the present disclosure.
Figure 5:
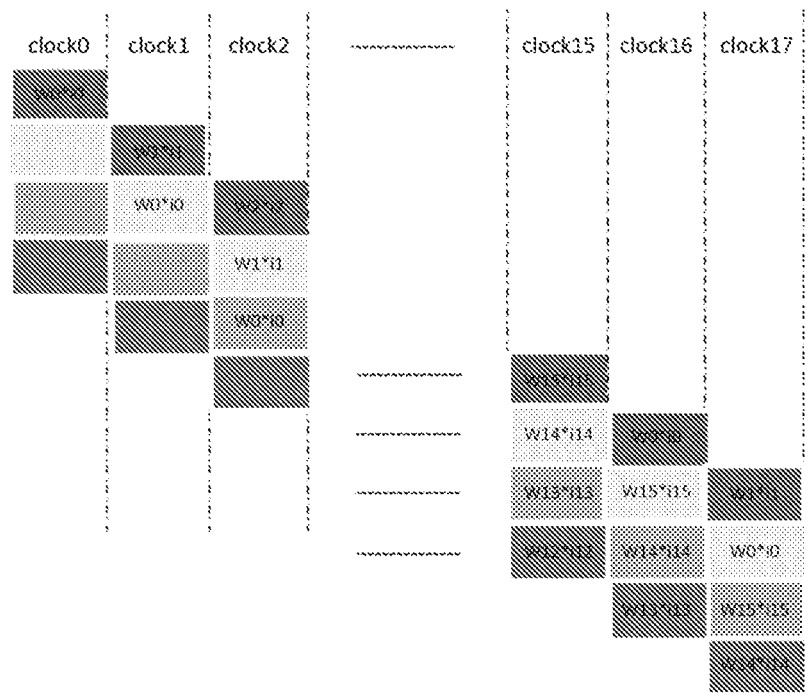
FIG. 5 is a schematic diagram showing product elements that are read in the clock cycles according to an embodiment of the present disclosure.

Operations of the apparatus 300 for convolution operation shown in FIG. 3 will be described below in conjunction with FIGS. 4 and 5. FIG. 4 is a schematic diagram showing matrix elements that are input in various clock cycles and product elements that are generated in the clock cycles according to an embodiment of the present disclosure. FIG. 5 is a schematic diagram showing product elements that are read in the respective clock cycles according to an embodiment of the present disclosure.

Referring to FIGS. 3 and 4, the multipliers M0 to M15 receive the matrix elements w0 to w15 and the matrix elements i0 to i15 in each clock cycle of a plurality of clock cycles clock0 to clock15, to generate product elements wo*i0 to w15*i15. In each of the plurality of clock cycles clock0 to clock15, each of the distributed caches LUTM0 to LUTM15 store a respective one of product elements wo*i0 to w15*i15 in a respective cache unit, which corresponds to the present clock cycle, of cache units Data0 to Data15 in the distributed caches, respectively. As an example, each the distributed caches LUTM0 to LUTM15 stores, in a cache unit Data0 thereof, a respective one of product elements wo*i0 to w15*i15 generated in clock cycle clock0. Further, each of the distributed caches LUTM0 to LUTM15 stores, in a cache unit Data1 thereof, a respective one of product elements wo*i0 to w15*i15 generated in clock cycle clock1. Analogously, each of the distributed caches LUTM0 to LUTM15 stores, in a cache units Data15 thereof, a respective one of product elements wo*i0 to w15*i15 generated in clock cycle clock15.

It is shown in FIG. 4 that the product elements wo*i0 to w15*i15 are generated in a clock cycle clock16. The 17th clock cycle clock16 may be considered as the start of a cycle of a convolution operation on the filter matrix and the input data matrix after the filter matrix is shifted to a next window position.

Referring to FIGS. 3 and 4, a read control signal ADDR_n is generated in each of the plurality of clock cycles clock0 to clock15, where n is less than or equal to 15 and greater than or equal to 0. As an example, a read control signal ADDR_0 is generated in clock cycle clock0, which corresponds to a cache unit Data0 and is used for reading a respective product element in cache unit Data0 of a respective distributed cache, and a read control signal ADDR_1 is generated in clock cycle clock1, which corresponds to cache unit Data1 and is used for reading a respective product element in a cache unit Data1 of a respective distributed cache. Analogously, a read control signal ADDR_15 is generated in clock cycle clock15, which corresponds to cache unit Data15 and is used for reading a respective product element in a cache unit Data15 of a respective distributed cache.

Referring to FIGS. 3 and 5, the read control signal ADDR_0 generated in clock cycle clock0 is provided to the distributed cache LUTM0, and the product element wo*i0 in the cache unit Data0 of the distributed cache LUTM0 is read in clock cycle clock0. The read control signal ADDR_0 generated in clock cycle clock0 is input to the register reg1, and the register reg1 delays the read control signal ADDR_0. In other words, the register reg1 stores the read control signal ADDR_0 in clock cycle clock0, and outputs the read control signal ADDR_0 in the next clock cycle clock1. The register reg1 provides the delayed read control signal ADDR_0 to the distributed cache LUTM1 in the next clock cycle clock1, and the product element w1*i1 in the cache unit Data0 of the distributed cache LUTM1 is read in clock cycle clock1. In addition, the read control signal ADDR_1 generated in clock cycle clock1 is provided to the distributed cache LUTM0, and the product element wo*i0 in the cache unit Data1 of the distributed cache LUTM0 is read in clock cycle clock1. In addition, in clock cycle clock1, the read control signal ADDR_0 is input to the register reg2, and the register reg2 delays the read control signal ADDR_0; the read control signal ADDR_1 is input to the register reg1, and the register reg1 delays the read control signal ADDR_1.

Analogously, in clock cycle clock2, the product element w2*i2 in the cache unit Data0 of the distributed cache LUTM2, the product element w1*i1 in the cache unit Data1 of the distributed cache LUTM1, and the product element w0*i0 in the cache unit Data2 of the distributed cache LUTM0 are read. In addition, in clock cycle clock15, the product element w15*i15 in the cache unit Data1 of the distributed cache LUTM15, the product element w14*i14 in the cache unit Data1 of the distributed cache LUTM14, . . . , and the product element w0*i0 in the cache unit Data15 of the distributed cache LUTM0 are read. FIG. 3 shows a respective product element in a cache unit Data15, Data14, Data0 that are received by the multiplexer MUL module in clock cycle clock15.

Referring to FIGS. 3 and 5, in clock cycle clock0, the multiplexer MUL module receives the product element wo*i0 in the cache unit Data0 of the distributed cache LUTM0, and provides the product element wo*i0 to the accumulator ACC0 corresponding to the cache unit Data0. In clock cycle clock0, the adder dsp0 in the accumulator ACC0 adds up the product element wo*i0 and null data, and stores an accumulation result in the register Reg0. In clock cycle clock1, the multiplexer MUL module receives the product element w1*i1 in the cache unit Data0 of the distributed cache LUTM1 and the product element wo*i0 in the cache unit Data1 of the distributed cache LUTM0, provides the product element w1*i1 in the cache unit Data0 of the distributed cache LUTM1 to the accumulator ACC0 corresponding to the cache unit Data0, and provides the product element wo*i0 in the cache unit Data1 of the distributed cache LUTM0 to the accumulator ACC1 corresponding to the cache unit Data1. In clock cycle clock1, the adder dsp0 in the accumulator ACC0 adds up the product element w1*i1 and the accumulation data generated in clock cycle clock0, and stores new accumulation data in the register Reg0, and the adder dsp1 in the accumulator ACC1 adds up the product element wo*i0 and null data, and stores an accumulation result in the register Reg1.

Analogously, in clock cycle clock15, the adder dsp0 in the accumulator ACC0 adds up the product element w15*i15 and the accumulation data generated in clock cycle clock14, and stores new accumulation data in the register Reg0. In this way, the sum of a respective product element w0*i0 to w15*i15 generated in clock cycle clock0, that is, the result of the convolution operation, is obtained. In clock cycle clock16 after the 16 clock cycles, the accumulator ACC0 outputs the result of the convolution operation on the respective matrix elements of the two matrices that are input in clock cycle clock0. In addition, in clock cycle clock16, the adder dsp1 in the accumulator ACC1 adds up the product element w15*i15 and the accumulation data generated in clock cycle clock15, and stores new accumulation data in the register Reg1. In this way, the sum of a respective product element w0*i0 to w15*i15 generated in clock cycle clock1, that is, the result of the convolution operation, is obtained. In clock cycle clock17 after the 17 clock cycles, the accumulator ACC1 outputs the result of the convolution operation on the respective matrix elements of the two matrices that are input in clock cycle clock1, and so on.

Referring to FIG. 5, the accumulators ACC0 to ACC15 each accumulate a respective product element of the respective cache units that are read by a delay of one clock cycle with each other, that is, accumulate a respective product element on the diagonal lines shown in the figure to respectively generate a result of a convolution operation corresponding to a clock cycle in which a respective product element are generated.

According to this embodiment of the present disclosure, a convolution operation is implemented by configuring a plurality of distributed caches and a register delay chain for read control signal for the plurality of distributed caches. The read control signal is delayed per stage while the products are maintained in the distributed caches, so as to prevent the transfer of intermediate calculation data by the register delay chain as in the systolic array structure. In this way, the apparatus for convolution operation according to this embodiment of the present disclosure reduces overall power consumption while saving register resources. Further, utilizing distributed caches that are usually idle, such as LUTMs in an FPGA, can save overall design resources and achieve resource balancing.

Figure 6:
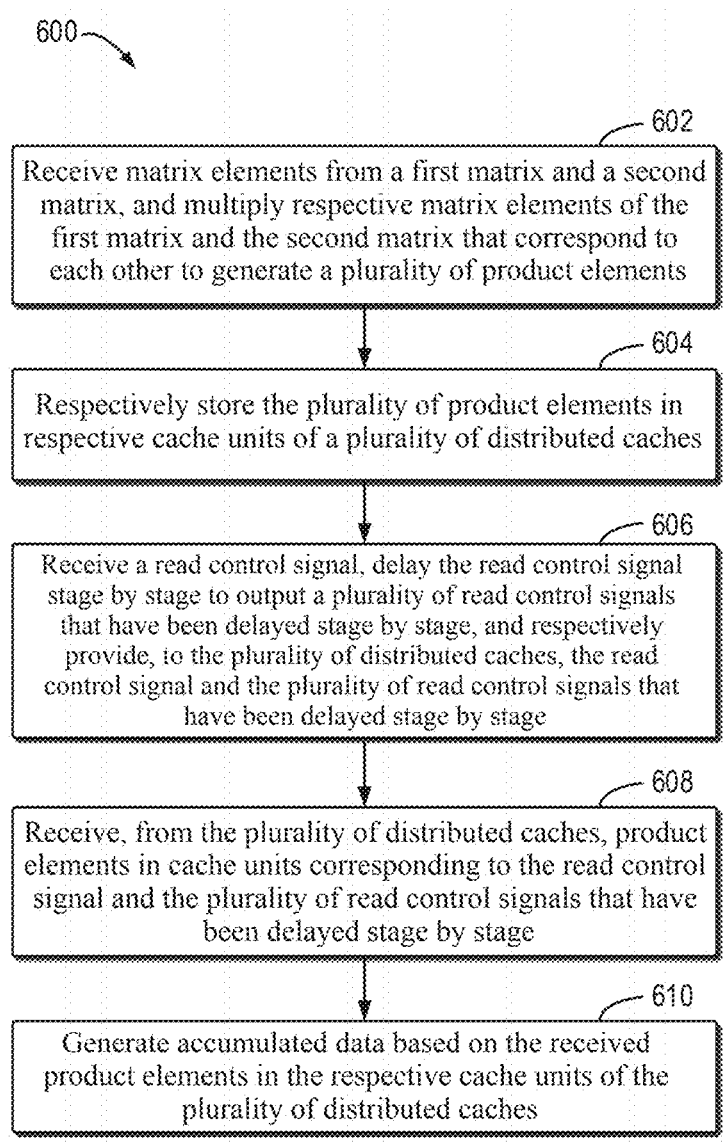
FIG. 6 is a flowchart showing a method for convolution operation according to an embodiment of the present disclosure.

FIG. 6 is a flowchart showing a method 600 for convolution operation according to an embodiment of the present disclosure. As shown in FIG. 6, the method 600 includes blocks 602 to 610.

At block 602, the method 600 includes receiving matrix elements from a first matrix and from a second matrix, and multiplying matrix elements of the first matrix with corresponding matrix elements of the second matrix to generate a plurality of product elements.

At block 604, the method 600 includes respectively storing the plurality of product elements in respective cache units of a plurality of distributed caches.

At block 606, the method 600 includes receiving a read control signal, delaying the read control signal per stage to output a plurality of per-stage delayed read control signals, and respectively providing, to the plurality of distributed caches, the read control signal and the plurality of per-stage delayed read control signals.

At block 608, the method 600 includes receiving, from the plurality of distributed caches, product elements in cache units corresponding to the read control signal and the plurality of per-stage delayed read control signals.

At block 610, the method 600 includes generating accumulation data based on the received product elements in the respective cache units of the plurality of distributed caches.

In some embodiments, the method 600 may further include sequentially generating read control signals that correspond to the plurality of cache units of the plurality of distributed caches, respectively.

In some embodiments, storing the plurality of product elements includes: respectively storing, in each clock cycle of a plurality of clock cycles, the plurality of product elements in cache units of the plurality of distributed caches that correspond to clock cycle; and generating the read control signals includes: generating, in each clock cycle of a plurality of clock cycles, read control signals corresponding to the respective cache units of the plurality of distributed caches.

In some embodiments, storing the plurality of product elements includes: respectively and sequentially storing, in the respective cache units of the plurality of distributed caches, the plurality of product elements generated in each clock cycle; and generating the read control signals includes: generating, in each clock cycle of a plurality of clock cycles, the read control signals comprising a read address directed to one of the plurality of cache units, and adding one address unit to the read address in a next clock cycle.

In some embodiments, generating the accumulation data includes: generating the accumulation data based on product elements in cache units corresponding to the read address.

It should be understood that the method for implementing this embodiment of the present disclosure can be written in any combination of one or more programming languages, to adapt to a system-on-chip (SoC) architecture. In addition, although the various operations are depicted in a order, it should be understood as requiring such operations to be performed in the order shown or in a sequential order, or requiring all illustrated operations to be performed to achieve desired results. Under certain circumstances, multitasking and parallel processing may be advantageous.

Although details of several implementations are included in the foregoing discussions, these details should not be construed as limiting the scope of the present disclosure. Some features that are described in the context of separate embodiments can also be implemented in combination in a single implementation. In contrast, various features described in the context of a single implementation may alternatively be implemented in a plurality of implementations individually or in any suitable subcombination.

Although the subject matter has been described in languages specific to structural features and/or logical actions of the method, it should be understood that the subject matter defined in the appended claims is not necessarily limited to the features or actions described above. On the contrary, the features and actions described above are merely exemplary forms for implementing the claims.

The invention claimed is:

1. An apparatus for convolution operation, comprising:
a plurality of multipliers configured to receive matrix elements from a first matrix and from a second matrix, respectively, and to generate a plurality of product elements, wherein each product element of the plurality of product elements is obtained by multiplying, by a respective multiplier, matrix elements of the first matrix and corresponding matrix elements of the second matrix;
a plurality of distributed caches respectively coupled to the plurality of multipliers and each distributed cache of the plurality of distributed caches comprising a plurality of cache units, wherein the plurality of distributed caches is each configured to store a respective one of the plurality of product elements in a respective cache unit thereof;
a register delay chain coupled to the plurality of distributed caches and comprising a plurality of registers coupled in series, wherein the register delay chain is configured to receive a read control signal, to delay the read control signal per stage to output a plurality of per-stage delayed read control signals, and to provide the read control signal and the plurality of per-stage delayed read control signals to the plurality of distributed caches, respectively; and
an accumulator circuit coupled to the plurality of distributed caches and configured to receive, from the plurality of distributed caches, product elements in cache units corresponding to the read control signal and the plurality of per-stage delayed read control signals, and to generate accumulation data based on the received product elements in the respective cache units of the plurality of distributed caches.

2. The apparatus according to claim 1, wherein the accumulator circuit comprises:
a multiplexer module coupled to the plurality of distributed caches and configured to receive the product elements in the cache units corresponding to the read control signal and the plurality of per-stage delayed read control signals; and
a plurality of accumulators, each accumulator of the plurality of accumulators being coupled to the multiplexer module and being configured to receive, from the multiplexer module, product elements in cache units of the plurality of distributed caches that correspond to the accumulator, and the plurality of accumulators being configured to generate the accumulation data based on the received product elements.

3. The apparatus according to claim 2, wherein the number of the plurality of accumulators is equal to the number of the plurality of cache units of each distributed cache of the plurality of distributed caches.

4. The apparatus according to claim 1, further comprising:
a read control signal generation circuit configured to sequentially generate read control signals that correspond to the plurality of cache units of the plurality of distributed caches, respectively.

5. The apparatus according to claim 4, wherein
the plurality of distributed caches is configured to store, in each clock cycle of a plurality of clock cycles, the plurality of product elements in cache units of the plurality of distributed caches that correspond to the clock cycle; and
the read control signal generation circuit is configured to generate, in each clock cycle of a plurality of clock cycles, a read control signal corresponding to a respective cache unit of each distributed cache of the plurality of distributed caches.

6. The apparatus according to claim 5, wherein each of the plurality of distributed caches is configured to store, in respective cache units thereof, the plurality of product elements generated in the respective clock cycle sequentially; and
the read control signal generation circuit is configured to generate, in each clock cycle of a plurality of clock cycles, the read control signals comprising a read address directed to one of the plurality of cache units, and add one address unit to the read address in a next clock cycle.

7. The apparatus according to claim 6, wherein each of the plurality of distributed caches is configured to output, to the accumulator circuit, a product element in a cache unit corresponding to the read address.

8. The apparatus according to claim 1, wherein the apparatus is comprised in a field-programmable gate array.

9. The apparatus according to claim 8, wherein each of the plurality of distributed caches is a lookup table memory (LUTM).

10. The apparatus according to claim 1, wherein the apparatus is comprised in an application-specific integrated circuit.

11. The apparatus according to claim 1, wherein the first matrix is an input data set matrix, and the second matrix is a filter set matrix;
wherein the input data set matrix comprises input data matrices with a number of channels, and the filter set matrix comprises filter matrices with a number of channels, and
wherein the number of channels of the input data matrices is equal to the number of channels of the filter matrices.

12. The apparatus according to claim 11, wherein the number of the plurality of cache units of each distributed cache of the plurality of distributed caches is equal to the number of channels of the filter matrices.

13. The apparatus according to claim 11, wherein in each clock cycle of a plurality of clock cycles, matrix elements in one channel of a filter matrix and corresponding matrix elements in one corresponding channel of an input data matrix are input to the plurality of multipliers, respectively.

14. The apparatus according to claim 11, wherein the number of the plurality of distributed caches is equal to the number of matrix elements of the filter matrix.

15. The apparatus according to claim 14, wherein the number of the plurality of registers is less than, by a predetermined value, the number of the plurality of distributed caches.

16. A computer-implemented method for convolution operation, comprising:
   receiving, by a plurality of multipliers, matrix elements from a first matrix and from a second matrix, and multiplying matrix elements of the first matrix with corresponding matrix elements of the second matrix to generate a plurality of product elements;
   storing respective product elements of the plurality of product elements in respective cache units of a plurality of distributed caches, wherein each of the plurality of distributed caches is coupled to a respective one of the plurality of multipliers;
   receiving, by a register delay chain coupled to the plurality of distributed caches and comprising a plurality of registers coupled in series, a read control signal, delaying, by the register delay chain, the read control signal per stage to output a plurality of per-stage delayed read control signals, and providing, to the plurality of distributed caches respectively, the read control signal and the plurality of per-stage delayed read control signals;
   receiving, by an accumulator circuit coupled to the plurality of distributed caches and from the plurality of distributed caches, product elements in cache units corresponding to the read control signal and the plurality of per-stage delayed read control signals; and
   generating, by the accumulator circuit, accumulation data based on the received product elements in the respective cache units of the plurality of distributed caches.

17. The method according to claim 16, further comprising:
   generating read control signals, each corresponding to a respective cache unit of the plurality of distributed caches, sequentially.

18. The method according to claim 17, wherein
storing the plurality of product elements comprises: storing, in each clock cycle of a plurality of clock cycles, each of the plurality of product elements in a cache unit that corresponds to the clock cycle of a respective one of the plurality of distributed caches; and
generating the read control signals comprises: generating, in each clock cycle of a plurality of clock cycles, read control signals each corresponding to a respective cache unit of the plurality of distributed caches.

19. The method according to claim 18, wherein
storing the plurality of product elements comprises: storing each of the plurality of product elements generated in each of the plurality clock cycles in a respective cache unit of the plurality of distributed caches sequentially; and
generating the read control signals comprises: generating, in each clock cycle of a plurality of clock cycles, the read control signals comprising a read address for one of the plurality of cache units, and increasing the read address by one address unit in a next clock cycle.

20. The method according to claim 19, wherein
generating the accumulation data comprises: generating the accumulation data based on product elements in cache units corresponding to the read address.

* * * * *